United States Patent
Chen et al.

(10) Patent No.: US 7,710,435 B2
(45) Date of Patent: May 4, 2010

(54) METHOD AND APPARATUS FOR GENERATING VISUAL EFFECTS

(75) Inventors: Zou-Ping Chen, Tai-Chung (TW); Cheng-Shun Liao, Chang-Hua Hsien (TW); Ming-Chun Chang, Chia-I (TW)

(73) Assignee: Realtek Semiconductor Corp., Hsinchu (TW)

( * ) Notice: Subject to any disclaimer, the term of this patent is extended or adjusted under 35 U.S.C. 154(b) by 296 days.

(21) Appl. No.: 11/161,949

(22) Filed: Aug. 23, 2005

(65) Prior Publication Data

US 2006/0044322 A1    Mar. 2, 2006

(30) Foreign Application Priority Data

Sep. 1, 2004    (TW) .............. 93126389 A

(51) Int. Cl.
*G09G 5/02*    (2006.01)
(52) U.S. Cl. .................................. 345/593
(58) Field of Classification Search ............... 345/589, 345/593, 626, 690
See application file for complete search history.

(56) References Cited

U.S. PATENT DOCUMENTS

| | | | | |
|---|---|---|---|---|
| 5,325,183 A | * | 6/1994 | Rhee | 348/578 |
| 6,297,797 B1 | * | 10/2001 | Takeuchi et al. | 345/467 |
| 6,380,945 B1 | | 4/2002 | MacInnis et al. | |
| 6,421,094 B1 | * | 7/2002 | Han | 348/569 |
| 6,542,162 B1 | * | 4/2003 | Hrusecky et al. | 348/569 |
| 6,570,579 B1 | | 5/2003 | MacInnis et al. | |
| 6,630,945 B1 | | 10/2003 | MacInnis et al. | |
| 6,771,263 B1 | * | 8/2004 | Behrens et al. | 345/424 |
| 2001/0033340 A1 | * | 10/2001 | Yui | 348/592 |

* cited by examiner

*Primary Examiner*—Aaron M Richer
(74) *Attorney, Agent, or Firm*—Thomas, Kayden, Horstemeyer & Risley

(57) ABSTRACT

A visual effect generating module for changing visual effects of a selected image block within an image area is disclosed. The visual effect generating module includes a color changing module for receiving and changing pixel values of a plurality of pixels within the selected image block and a first multiplexer coupled to the color changing module for selectively outputting pixels corresponding to the image area or pixels output from the color changing module.

8 Claims, 4 Drawing Sheets

METHOD AND APPARATUS FOR GENERATING VISUAL EFFECTS

BACKGROUND OF THE INVENTION

1. Field of the Invention

The present invention relates to an image processing technique, and more particularly, to a method and apparatus for generating visual effects.

2. Description of the Prior Art

As conventional analog video broadcasting is transforming into digital video broadcasting (DVB), digital television becomes more and more popular. In general, the interaction between the digital TV and users is achieved through dialogue blocks or an on-screen display (OSD) shown on the screen. For highlighting an item or a button that been selected by the user, the most common means in the prior art is to change the visual effects of the selected item or button so as to distinguish the selected item or button from other items or buttons. For example, the original color of the selected item can be replaced with another color to emphasize the item.

In the conventional digital television displaying technique, the selected item is displayed on a layer, and a mask graphic object is created on a layer above the layer to which the selected item belongs. The mask graphic object is allocated in a location with respect to the selected item. A video mixer/blender is then employed to mix data of different layers into a composed image. As a result, the mask graphic object covers the selected item in the composed image so that the user senses the visual effect change of the selected item.

In conventional technique, each layer of the digital television requires a corresponding layer processing circuit, which is a complex and costly component. Therefore, the number of layers of the conventional digital television is limited. As mentioned above, the convention art requires at least two layer processing circuits to change the visual effects of a specific block. Obviously, system resources are wasted and hardware costs are increased in the conventional art.

SUMMARY OF THE INVENTION

It is therefore one of objectives of the invention to provide a visual effect generating apparatus and method to solve the above-mentioned problem.

It is therefore one of objectives of the invention to provide a visual effect generating apparatus and method to easily change the visual effects of the selected image block.

It is therefore one of objectives of the invention to provide a visual effect generating apparatus to reduce the computational requirements and hardware resources.

According to a preferred embodiment of the present invention, an apparatus for changing a visual effect of a selected image block within an image area is disclosed comprising: a color changing module for receiving and changing pixel values of a plurality of pixels within the selected image block; and a first multiplexer coupled to the color changing module for selectively outputting pixels corresponding to the image area or pixels output from the color changing module.

According to the preferred embodiment of the present invention, a visual effect generating method for changing visual effects of a selected image block within an image area is disclosed comprising: changing pixel values of a plurality of pixels within the selected image block; and selectively outputting pixels corresponding to the image area or the changed pixel values of the plurality of pixels.

These and other objectives of the present invention will no doubt become obvious to those of ordinary skill in the art after reading the following detailed description of the preferred embodiment that is illustrated in the various figures and drawings.

DETAILED DESCRIPTION

The present invention method and apparatus for generating visual effects can be applied in digital televisions, a set top box (STB) or other digital graphic displaying circuits. For convenient description, the method and apparatus of the present invention are hereinafter assumed to be applied in a digital television.

Figure 1:
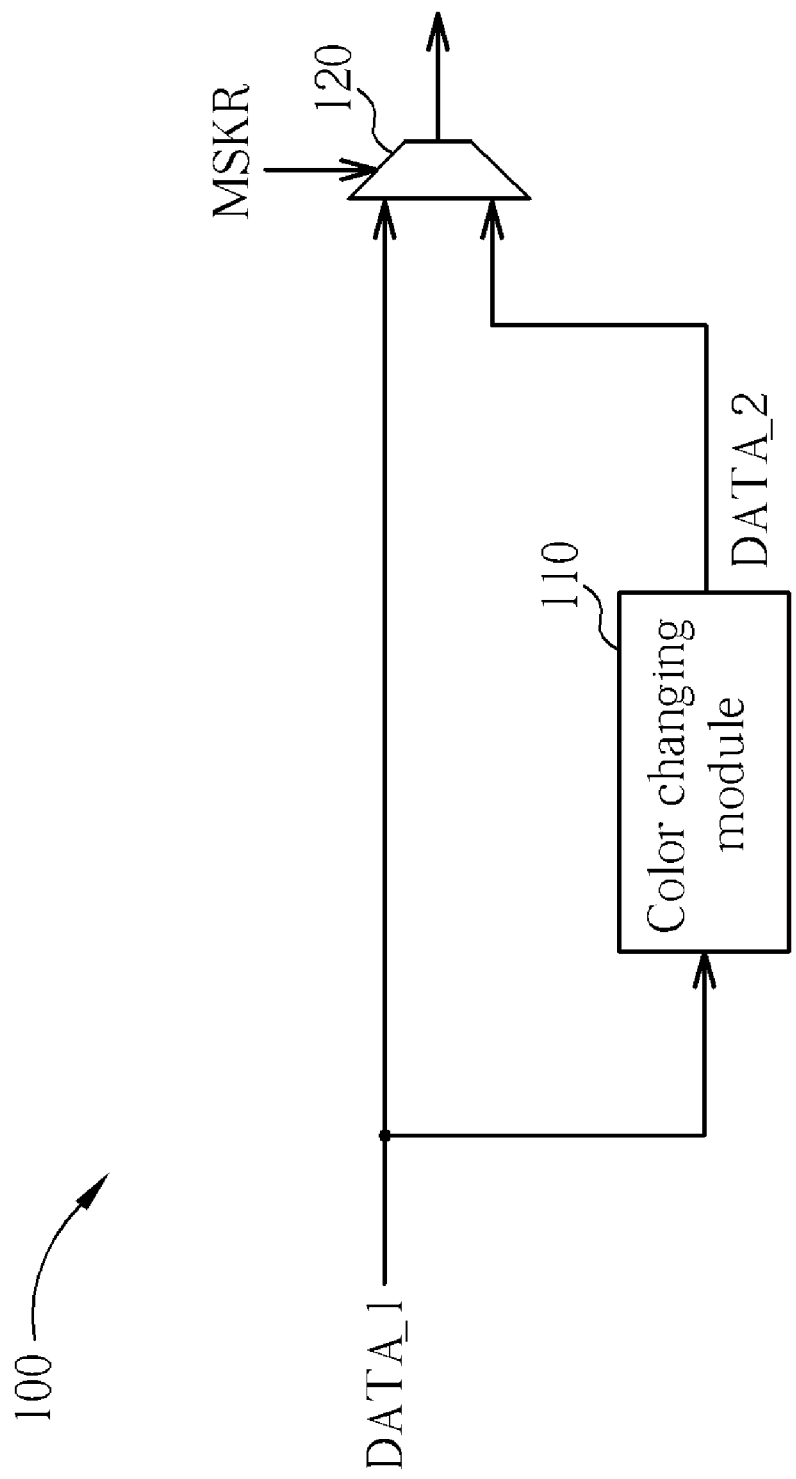
FIG. 1 is a block diagram of a visual effect generating module according to a first embodiment of the present invention.
Figure 2:
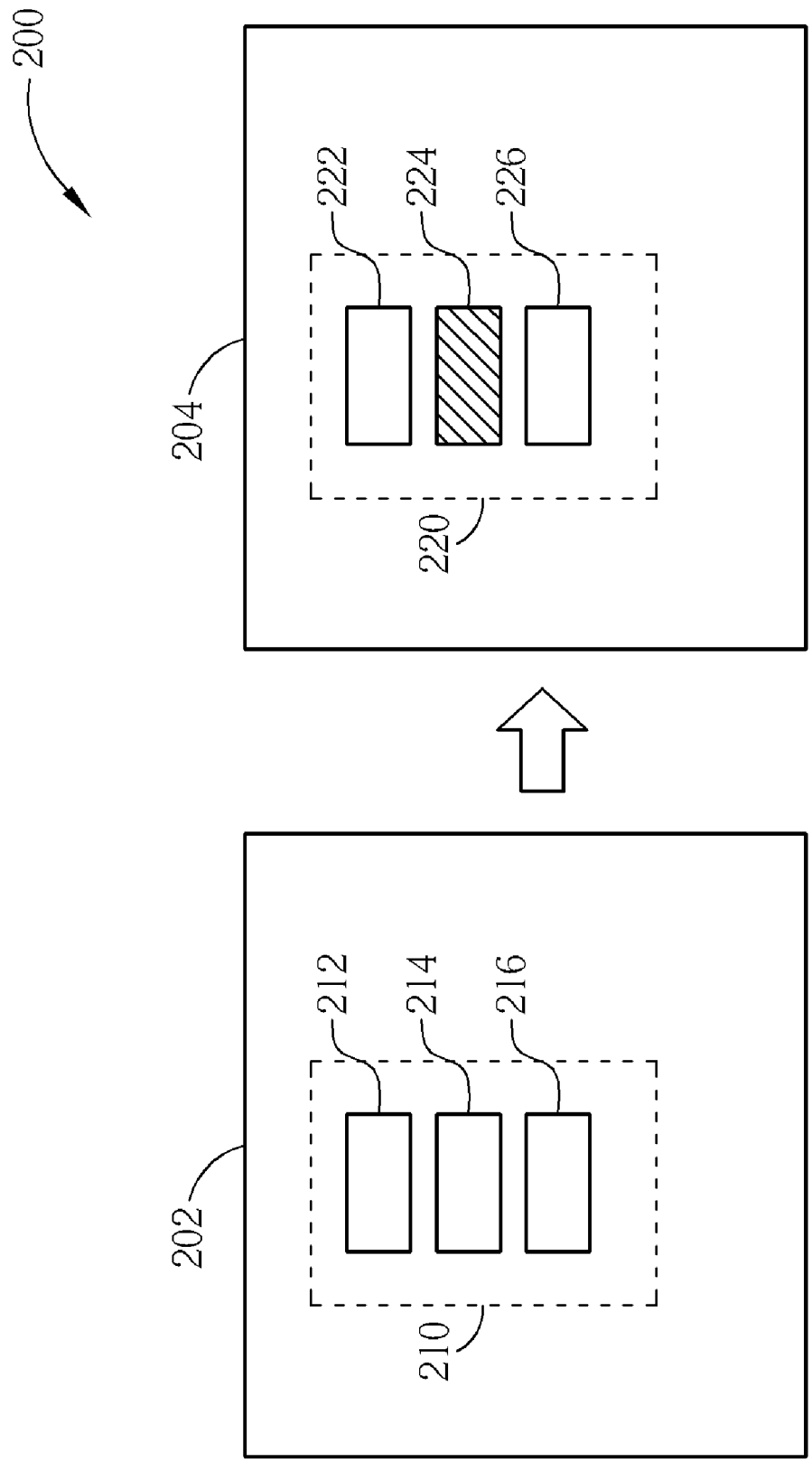
FIG. 2 is a schematic diagram describing visual effects of a selected block within an image changed by the visual effect generating module of FIG. 1.

Please refer to FIG. 1 and FIG. 2. FIG. 1 shows a block diagram of a visual effect generating module 100 according to a first embodiment of the present invention. FIG. 2 depicts a schematic diagram describing the visual effects of a selected block within an image changed by the visual effect generating module 100. In FIG. 2, an image area 210 of an image 202 represents a dialogue block or an OSD (on-screen display). For convenience, the image area 210 is herein assumed to be an OSD and comprises three items. The three items are represented with image blocks 212, 214 and 216. The operations of the visual effect generating module 100 to change the visual effects of the image block 214 when a user selects the image block 214 of the image 202 through a remote control or a functional button of the digital television are described below.

As shown in FIG. 1, the visual effect generating module 100 of this embodiment comprises a color changing module 110 and a multiplexer 120. The color changing module 110 is used for receiving and changing pixel data DATA_1 of the image area 210. The multiplexer 120 is used for selectively outputting the original pixel data DATA_1 of the image area 210 or the processed pixel data DATA_2 output from the color changing module 110 under the control of a control signal MSKR corresponding to the location information of the image block 214. In the digital television of the present invention, a video mixer/blender is configured in the following stage of the visual effect generating module 100. The video mixer/blender is used for mixing the output data of the multiplexer 120 and other video data or subtitle data to generate an image 204 shown in FIG. 2.

In the image 204, the output data of the multiplexer 120 corresponds to an image area 220. As shown in FIG. 2, image blocks 222 and 226 remain the same as the image blocks 212 and 216 of the image 202, but the image block 214 of the image 202 changes to another image block 224 since it has been processed by the color changing module 110. Since the images 202 and 204 are continuous images, the selected item can be clearly perceived by the user through the visual representation changed from the image block 214 to the image block 224.

The color changing module 110 can be implemented in various ways. For example, the color changing module 110 could be a shadow processor, which changes the visual effects of the image block 214 by creating or changing the color of a shadow. In another embodiment, the color changing module 110 is implemented with a simple logic gate, such as a AND gate, OR gate or a NOT gate, which changes the color of a graphic block by performing a simple logic operation on the color value of the graphic block with a predetermined color value. In addition, the color changing module 110 could also be implemented with a color replacing circuit, which changes the visual effects of a graphic block by replacing a specific color value of the graphic block with another color value.

In practical implementations, the color changing module 110 can only process a plurality of pixels corresponding to the image block 214 instead of all the pixels within the pixel data DATA_1 of the image area 210. Accordingly, the visual effect generating module 100 of this embodiment can use the control signal MSKR corresponding to the location information of the image block 214 to act as an enable signal of the color changing module 110. As a result, the color changing module 110 only processes the plurality of pixels of the image block 214 (e.g., pixels of the border of the image block 214) and the computational requirement is thereby reduced.

Figure 3:
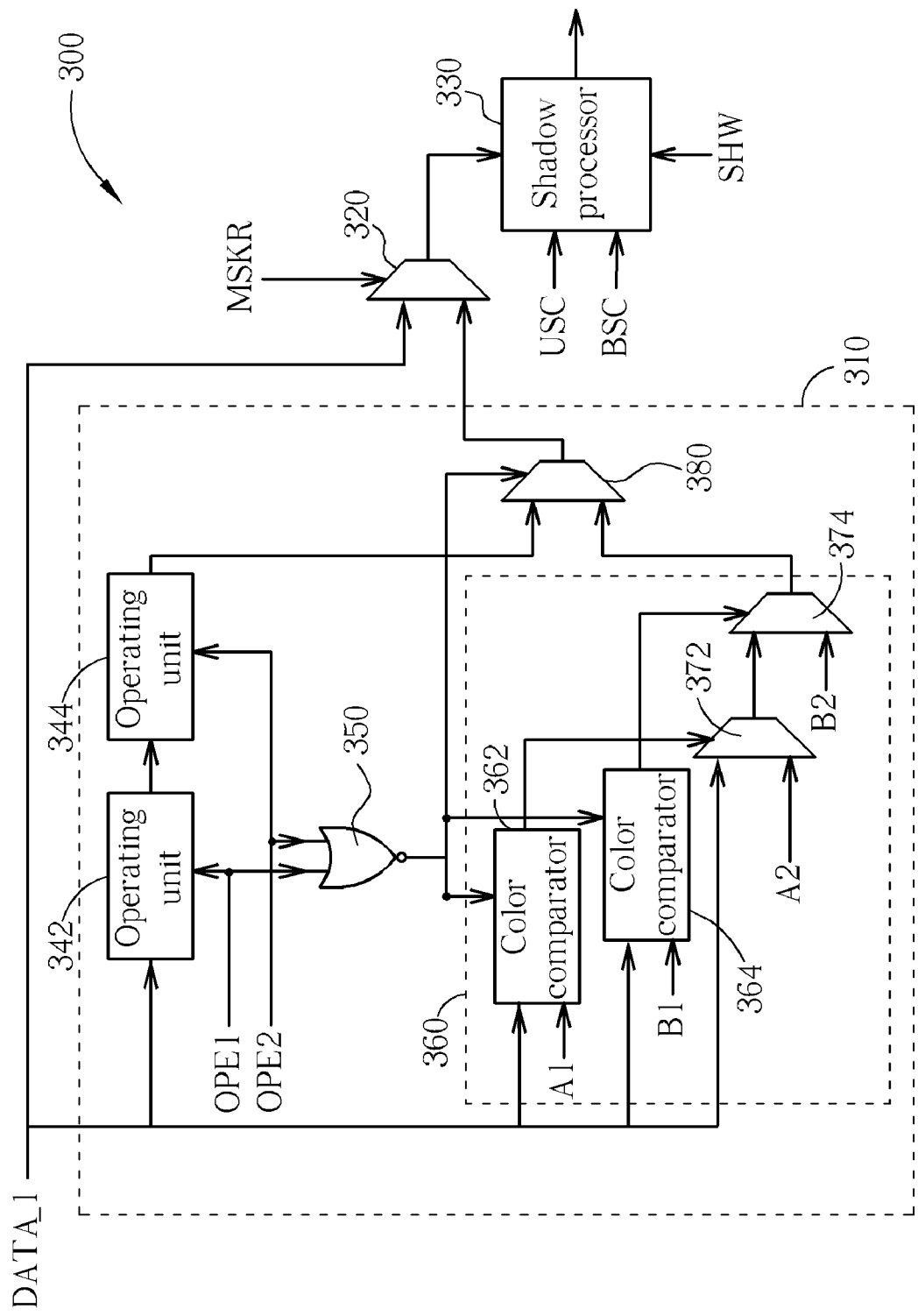
FIG. 3 is a block diagram of a visual effect generating module according to a second embodiment of the present invention.

FIG. 3 shows a block diagram of a visual effect generating module 300 according to a second embodiment of the present invention. The visual effect generating module 300 varies the visual effects of graphic blocks by integrating several different visual effect generating mechanisms. As shown in FIG. 3, the visual effect generating module 300 comprises a color changing module 310, a multiplexer 320 and a shadow processor 330. In this embodiment, the color changing module 310 further comprises two logic circuits 342 and 344, a NOR gate 350, a color replacing module 360 and a multiplexer 380. The operation of the components of the color changing module 310 is described as follows.

When a first enable signal OPE1 is enabled, the logic circuit 342 performs a first logic operation on the color value of each pixel of the pixel data DATA_1 with a first color value. When a second enable signal OPE2 is enabled, the logic circuit 344 performs a second logic operation on the color value of each pixel of the pixel data DATA_1 with a second color value. In practical implementations, the logic circuits 342 and 344 could be logic gates corresponding to the first and second logic operations, respectively. The logic circuits 342 and 344 can generate fancy visual effects for graphic blocks with rich color. Note that, the number of logic circuits employed in the color changing module 310 can be adjusted based on the design requirement and is not limited to the shown embodiment.

On the other hand, the color replacing module 360 of the color changing module 310 is used for replacing a specific color value of the image area 210 with another predetermined color value. In this embodiment, the color replacing module 360 comprises two color comparators 362 and 364, and two multiplexers 372 and 374. When the color comparator 362 is enabled, it sequentially compares the color value of each pixel of the pixel data DATA_1 with a color value A1. Once the color value of a pixel is the same as the color value A1, the color comparator 362 controls the multiplexer 372 to output a color value A2 as the color value of the pixel. In other words, the cooperation between the color comparator 362 and the multiplexer 372 replaces the color value A1 of the pixel data DATA_1 with the color value A2. In the same way, the cooperation between the color comparator 364 and the multiplexer 374 replaces a color value B1 of the pixel data DATA_1 with a color value B2.

In this embodiment, when both the enable signals OPE1 and OPE2 of the logic circuits 342 and 344 are not enabled, the NOR gate 350 enables the color comparators 362 and 364, and controls the multiplexer 380 to output the data output from the color replacing module 360. On the contrary, if one of the enable signals OPE1 and OPE2 is enabled, the NOR gate 350 controls the multiplexer 380 to output the data output from the logic circuit 342 or 344. That is, the multiplexer 380 acts as a switch. In one embodiment, at least one logical operating unit (e.g., logic circuit 342) is configured to perform a first logic operation on a value of each pixel (e.g., DATA) of a selected image block with a first color value according to a first control signal (e.g., OPE1). A logic circuit (e.g., NOR gate 350) performs a second logic operation on the first control signal (e.g., OPE1) to output a second control signal (e.g., control signal for multiplexer 380).

Similar with the multiplexer 120 shown in FIG. 1, the multiplexer 320 selectively outputs the original pixel data DATA_1 of the image area 210 or the data output from the color changing module 310 according to the control signal MSKR corresponding to the location information of the image block 214. In this embodiment, the visual effect generating module 300 further configures a shadow processor 330 in the next stage of the multiplexer 320. When a shadow enable signal SHW enables the shadow processor 330, the shadow processor 330 creates a shadow effect for the selected graphic block according to an upper shadow color USC and a bottom shadow color BSC. Note that, in the visual effect generating module 300 or the present invention, the shadow processor 330 could be configured in the previous stage of the color changing module 310.

In practice, the setting of parameters OPE1, OPE2, A1, A2, B1, B2, USC, BSC, SHW and MSKR required for the visual effect generating module 300 could be stored in a buffer or a memory. A programmer or designer can change the visual effect representation of graphic blocks by adjusting those parameters.

Figure 4:
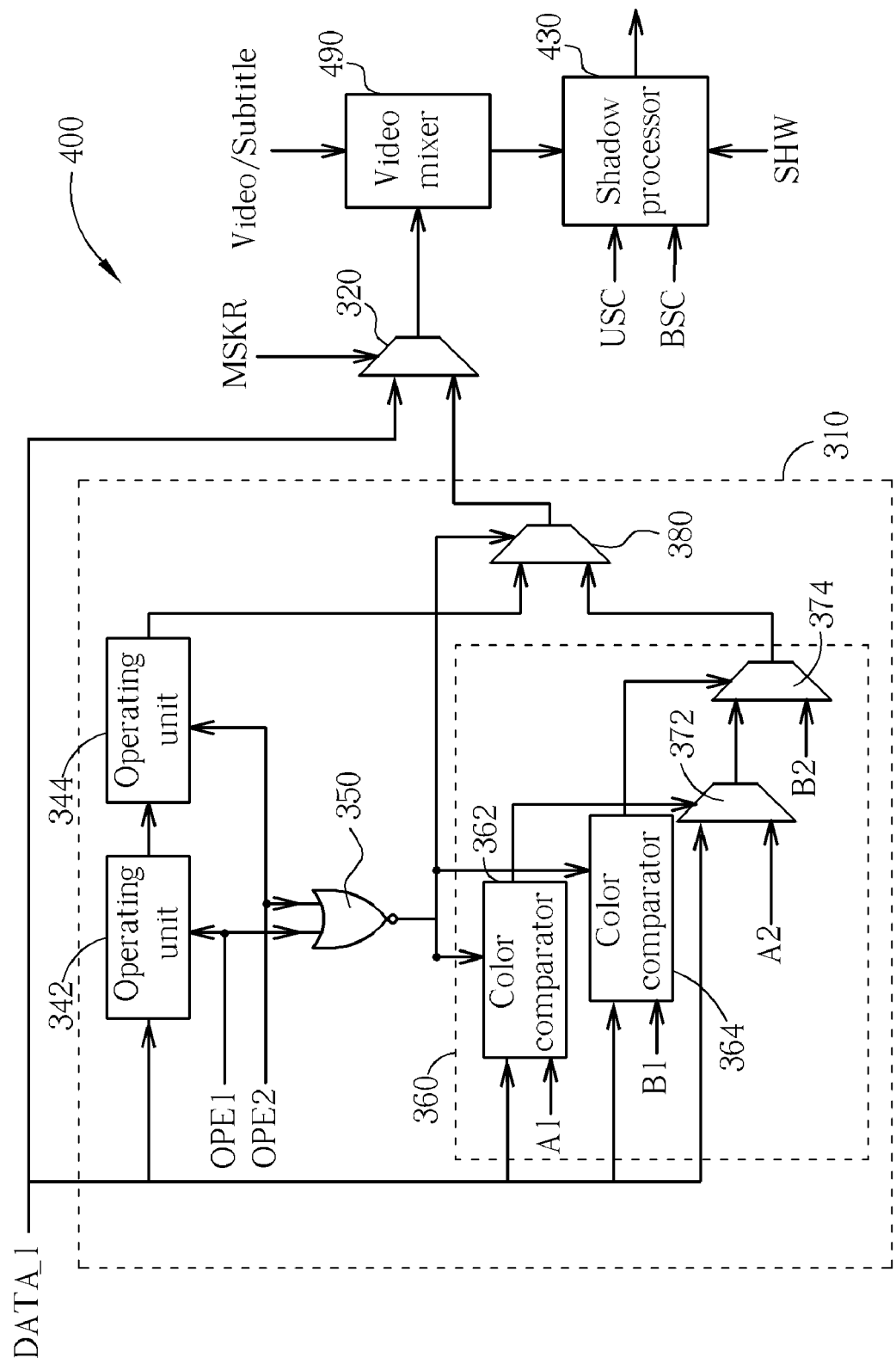
FIG. 4 is a block diagram of a visual effect generating module according to a third embodiment of the present invention.

Please refer to FIG. 4, which depicts a block diagram of a visual effect generating module 400 according to a third embodiment of the present invention. The visual effect generating module 400 is similar to the visual effect generating module 300, and the similar components are labeled using the same numerical labels as in FIG. 3. In the visual effect generating module 300 shown in FIG. 3, after the data output from the multiplexer 320 is processed by the shadow processor 330, a video mixer/blender (not shown) is employed to mix the data processed by the shadow processor 330 and other video or/and subtitle data. In the visual effect generating module 400 shown in FIG. 4, a video mixer 490 is first employed to mix the data output from the multiplexer 320 and other video or/and subtitle data, then a shadow processor 430 is employed to create a shadow effect for the selected graphic block of the composite data. Both of the above two embodiments achieve the purpose of changing the visual effects of the image block 214, but the visual effect generating module 400 generally has a better output image quality.

As mentioned above, the color changing module 310 only needs to process the plurality of pixels of the image block 214 instead of all the pixels of the pixel data DATA_1 of the image area 210. Therefore, in the visual effect generating module 300 or 400, the control signal MSKR can also be employed as the enable signal of the color changing module 310. As a result, the color changing module 310 only processes the plurality of pixels of the image block 214, and the computational requirement is thereby further reduced. In this way, the present invention can easily implement an emphasized effect for a selected graphic block or region without occupying any layer processing circuit of the digital television.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for changing a visual effect of a selected image block within an image area, the apparatus comprising:
    a color changing module comprising:
        at least one logical operating unit to perform a first logic operation on a value of each pixel of the selected image block with a first color value according to a first control signal;
        a logic circuit to perform a second logic operation on the first control signal to output a second control signal;
    at least one color replacing module to replace a specific color value of the selected image block with a first predetermined color value according to the second control signal; and
    a first multiplexer to select one of outputs of the at least one logical operating unit and the at least one color replacing module, and to output the selected output according to the second control signal.

2. The apparatus of claim 1, further comprising:
    a second multiplexer coupled to the color changing module for selectively outputting pixels corresponding to the image area or pixels output from the color changing module according to a third control signal.

3. The apparatus of claim 1, further comprising:
    a shadow processor coupled to the second multiplexer to generate a shadow effect for the selected image block according to an upper shadow color and a bottom shadow color.

4. The apparatus of claim 3, further comprising:
    a storage unit coupled to the color changing module and the shadow processor to store the first control signal, the specific color value, the first predetermined color value, the upper shadow color, and the bottom shadow color.

5. The apparatus of claim 3, wherein at least one of first color value, the specific color value, the first predetermined color value, the upper shadow color, and the bottom shadow color is adjusting such that the visual effect of the selected image block is changing.

6. The apparatus of claim 1, wherein the at least one color replacing module comprises:
    a color comparator for respectively comparing the color value of the pixels and the specific color value; and
    a second multiplexer coupled to the color comparator for outputting the first predetermined color value of the pixel when the color value of one of the pixel equals to the specific color value.

7. The apparatus of claim 6, further comprising:
    a blender coupled to the first multiplexer for blending the output of the first multiplexer and video data.

8. The apparatus of claim 1, wherein one of the at least one logical operating unit and the at least one color replacing module is enabled according to a value of the first control signal.

* * * * *